United States Patent
Caudill

(10) Patent No.: US 8,278,868 B2
(45) Date of Patent: Oct. 2, 2012

(54) ENVIRONMENTAL POWER GENERATION DEVICE AND ASSOCIATED METHODS

(76) Inventor: Guy Caudill, St. Augustine, FL (US)

( * ) Notice: Subject to any disclaimer, the term of this patent is extended or adjusted under 35 U.S.C. 154(b) by 391 days.

(21) Appl. No.: 12/629,921

(22) Filed: Dec. 3, 2009

(65) Prior Publication Data

US 2010/0181958 A1   Jul. 22, 2010

Related U.S. Application Data

(60) Provisional application No. 61/145,594, filed on Jan. 19, 2009.

(51) Int. Cl.
*H01M 10/44* (2006.01)
*H02J 7/00* (2006.01)
*H02J 1/00* (2006.01)

(52) U.S. Cl. ........ 320/101; 320/107; 320/114; 320/115; 307/16; 307/18; 307/21; 307/23; 307/29

(58) Field of Classification Search .................... 320/101
See application file for complete search history.

(56) References Cited

U.S. PATENT DOCUMENTS

| | | |
|---|---|---|
| 5,075,564 A | 12/1991 | Hickey |
| 5,254,876 A | 10/1993 | Hickey |
| 7,045,702 B2 | 5/2006 | Kashyap |
| 2002/0195989 A1* | 12/2002 | Teramoto ...................... 320/101 |
| 2009/0041584 A1* | 2/2009 | Gray et al. ................. 416/204 A |
| 2009/0139563 A1* | 6/2009 | Wung ............................ 136/246 |
| 2009/0315393 A1* | 12/2009 | Yeh .............................. 307/10.1 |

* cited by examiner

*Primary Examiner* — Edward Tso
*Assistant Examiner* — Ahmed Omar
(74) *Attorney, Agent, or Firm* — Mark R. Malek, Esq.; Zies Widerman & Malek

(57) ABSTRACT

An environmental power generation device may include a base, a turbine mounting structure carried by the base and a wind turbine carried by the turbine mounting structure. The environmental power generation device may also include a power generator in communication with the wind turbine. The power generator may include a rotor in communication with the wind turbine, and a stator in rotational communication with the rotor. The environmental power generation device may further include a solar cell mounting structure connected to the base, and a solar cell connected to the solar cell mounting structure and positioned to overlie the wind turbine.

15 Claims, 5 Drawing Sheets

ENVIRONMENTAL POWER GENERATION DEVICE AND ASSOCIATED METHODS

RELATED APPLICATIONS

This application claims the benefit of U.S. Provisional Patent Application Ser. No. 61/145,594 titled Environmental Power Generator filed on Jan. 19, 2009, the entire contents of which are incorporated herein by reference.

FIELD OF THE INVENTION

The present invention relates to the field of power generation and, more specifically, to the field of harnessing environmental energy to generate power.

BACKGROUND OF THE INVENTION

Over the past several years, much attention has been drawn to a possible energy crisis and global warming issues. Power generation has been attributed to global warming, especially when burning fossil fuels to generate electricity. There have been many attempts to harvest renewable energy to decrease pollution and reliance on fossil fuels. For example, there has been a significant increase in solar technologies and wind harvesting technologies.

There have been attempts to combine the harnessing of wind and solar power in one device. For example, U.S. Pat. Nos. 5,075,564 and 5,254,876, both to Hickey disclose a combined solar and wind powered generator. The combination solar and wind powered generator includes a wind generator including a plurality of wind vanes that are responsive to air flow currents and a plurality of light sensitive cells carried by the wind vanes adapted for transforming light energy to electrical energy.

U.S. Pat. No. 7,045,701 to Kashyap discloses a solar paneled windmill having aerodynamic fan blades provided with solar panels. The fan blades are connected to an axel/shaft, which is connected to a windmill power generator to produce electricity responsive to rotation of the fan blades. The assembly of the Kashya; '701 device includes solar panels covering a substantial portion thereof. The device also includes an electro-mechanical mechanism for converting kinetic energy from the rotation of the blades and solar energy collected by the solar panels into electrical energy.

The devices disclosed above are directed to large applications. In other words, the devices disclosed above can be rather large in size, and are generally provided by structures that are to be constructed on real property. Accordingly, implementation of such devices can be quite expensive. There exists a need for an environmental power generation device having a size suitable for several different uses.

SUMMARY OF THE INVENTION

In view of the foregoing background, the environmental power generator according to the present invention advantageously provides a source of clean energy based on renewable resources. The environmental power generator according to the present invention is advantageously designed to produce power using wind and sun, while simultaneously reducing the need for obtaining power from public electric utilities. The eco-friendly device may advantageously be mounted to the roof of a building or provide a source of power to an individual structure, such as a residential structure, an office building, a school, or any other building where alternative sources of energy may be used. The environmental power generator according to the present invention may also advantageously be used to store energy in batteries to be used at a later time to provide power.

These and other advantages, benefits and features according to the present invention are provided by an environmental power generation device comprising a base, a turbine mounting structure carried by the base, and a wind turbine carried by the turbine mounting structure. The environmental power generation device may also include a power generator in communication with the wind turbine. The power generator may include a rotor in communication with the wind turbine, and a stator in rotational communication with the rotor. The environmental power generation device may further include a solar cell mounting structure connected to the base and a solar cell connected to the solar cell mounting structure and positioned to overlie the wind turbine.

In one embodiment of the environmental power generation device, the rotor may be carried by the wind turbine so that rotation of the wind turbine causes rotation of the rotor. In another embodiment of the environmental power generation device, the turbine mounting structure may include a base, a lower mounting sleeve connected to the base, and an upper mounting sleeve connected to the lower mounting sleeve. In such an embodiment, the environmental power generation device may include a rotational shaft extending between the wind turbine and the rotor so that rotation of the wind turbine causes rotation of the rotational shaft and so that rotation of the rotational shaft causes rotation of the one rotor. The rotational shaft may pass through the top sleeve and the bottom sleeve to be connected to the rotor.

The solar cell mounting structure may include a plurality of support legs connected to the turbine mounting structure, and a solar cell mounting base carried by a top portion of the plurality of support legs. The solar cell mounting base may be mirrored. This configuration may advantageously enhance the amount of solar energy that may be captured using the solar cells.

The environmental power generation device according to the present invention may also include a mounting track carried by the base. The base of the turbine mounting structure may be slidably connected to the mounting track. This advantageously allows for customized configuration of the wind turbine, i.e., allows the position of the wind turbine to be slidably adjusted. The environmental power generation device may also include a cover to be connected to the base and positioned to overlie the turbine mounting structure and the mounting track. The device may further include an energy storage device in communication with the power generator and the solar cell for storing energy generated by the power generator or collected from the solar cell. The energy storage device may be at least one battery. The environmental power generation device may also include a controller to selectively operate at least one of the power generator and the solar cell. This advantageously allows for flexibility to use the system depending upon environmental conditions.

A method aspect of the present invention is for harnessing wind energy and solar energy to generate power using an environmental power generation device. The method includes positioning a power generator in communication with a wind turbine, and selectively operating the power generator and the solar cell using a controller.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations refer to similar elements in alternate embodiments.

Referring to FIGS. 1-8, an environmental power generation device 10 according to the present invention is now described in greater detail. The environmental power generation device 10 includes a base 12 and a turbine mounting structure 14 carried by the base. The environmental power generation device 10 also includes a plurality of wind turbines 16 carried by the turbine mounting structure 14. Although three wind turbines 16 are illustrated in the appended figures, those skilled in the art will appreciate that the environmental power generation device 10 according to an embodiment of the present invention can be successfully made with any number of wind turbines while still accomplishing the goals, features and advantages according to the present invention.

Figure 4:
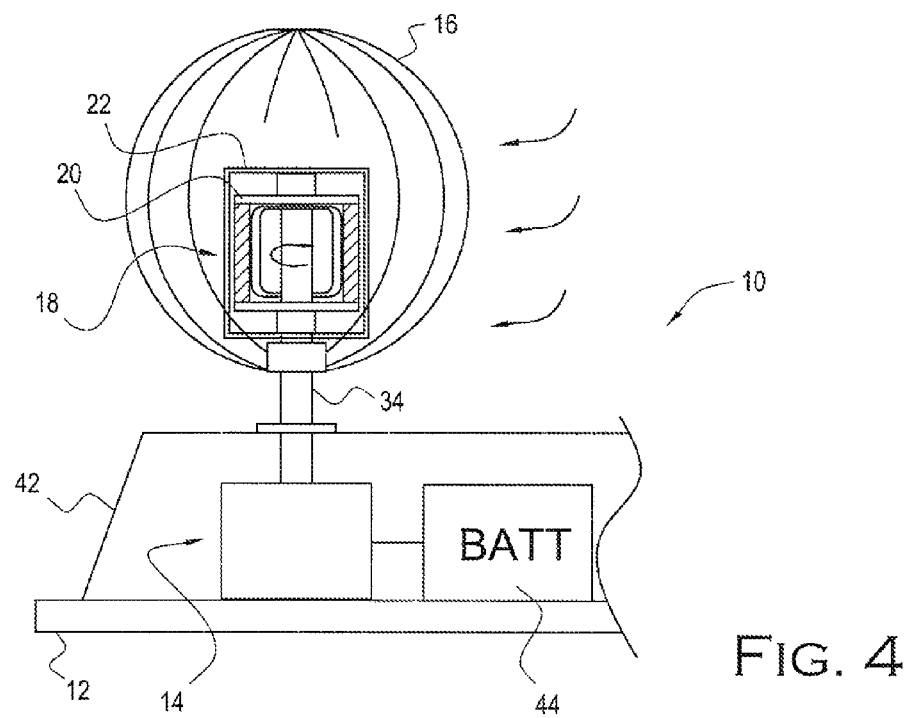
FIG. 4 is a side perspective view of a wind turbine of an environmental power generation device according to the present invention showing a stator positioned therein.

The environmental power generation device 10 according to an embodiment of the present invention may also include a power generator 18 in communication with the wind turbines 16. As perhaps best illustrated in FIGS. 4 and 5, the power generator 18 may include a rotor 20 in communication with the wind turbine 16 and a stator 22 in rotational communication with the rotor. Referring specifically to FIG. 4, one embodiment of the power generator 18 is now described in greater detail. In the embodiment of the environmental power generation device 10 illustrated in FIG. 4 according to the present invention, the rotor 20 and stator 22 are illustratively carried by the wind turbine 16. More specifically, the rotor 20 may be connected to a shaft 34 that is in communication with the wind turbines 16. Accordingly, as the wind turbines 16 rotate, the shafts rotate, thereby causing rotation of the rotors 20 of the power generators 18 with respect to the stators 22.

Figure 5:
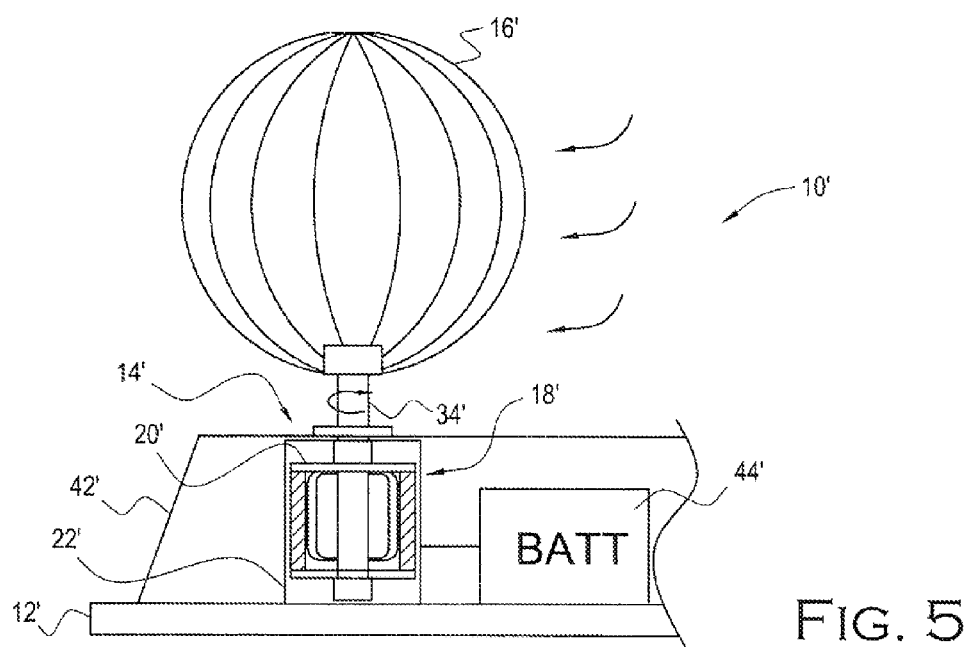
FIG. 5 is a side perspective view of a wind turbine of an environmental power generation device showing a stator connected thereto via a shaft.

Referring now additionally to FIG. 5, another embodiment of the power generator 18' of the environmental power generation device 10' according to the present invention is now described in greater detail. In this embodiment of the environmental power generation device 10' according to the present invention, the rotor 20' is connected to a shaft 34' that is connected to the wind turbine 16'. More specifically, the rotor 20' is spaced apart from the wind turbine 16'. Similar to the first embodiment of the environmental power generation device 10 according to the present invention, rotation of the wind turbine 16' of this embodiment of the environmental power generation device 10' according to the present invention causes rotation of the rotor 20' with respect to the stator 22'.

The configuration of the environmental power generation device 10 according to an embodiment of the present invention illustrates the plurality of wind turbines 16 being configured in a linear fashion. Those skilled in the art, after having had the benefit of this disclosure, will appreciate that the environmental power generation device 10 according to an embodiment of the present invention advantageously contemplates that the wind turbines 16 can be configured in any manner and still accomplish the goals, features and advantages according to the present invention. More specifically, the wind turbines 16 may, for example, be configured in a triangular relationship to one another (when using three wind turbines, for example) or may be configured in a polygonal relationship, or any other number of relationships, as will be appreciated and understood by the skilled artisan. Both a linear configuration of the wind turbines 16 and other configurations are advantageous. For example, the linear configuration may advantageously be better suited for certain wind patterns that tend to be geographically specific. Other configurations may be advantageous depending on the amount of space available for installation of the environmental power generation device 10.

Referring back to FIGS. 1 and 2, additional features of the environmental power generation device 10 according to an embodiment of the present invention are now described in greater detail. The environmental power generation device 10 may illustratively include a solar cell mounting structure 24 connected to the base 12. The environmental power generation device 10 may also include a solar cell 26 connected to the solar cell mounting structure 24 and positioned to overlie the wind turbine 16. Those skilled in the art will appreciate, however, that the environmental power generation device 10 may include any number of solar cells 26 in order to carry out the features, objects and advantages of the present invention. Of course, it is preferably to include multiple solar cells 26 to take advantage of additional solar energy that can be captured using the environmental power generation device 10 according to an embodiment of the present invention.

The solar cells 26 illustrated in the appended figures are shown as having a curved top. The curved top configuration of the solar cells 26 according to an embodiment of the present invention is advantageous in that it is adapted to harness as much solar energy as possible. An embodiment of the environmental power generation device 10 according to the present invention contemplates that the solar cells 26 may have a flat configuration and may be connected to a device that allows the solar cells to tilted. This advantageously allows the solar cells 26 to be positioned in a manner that tracks the sun as the sun moves from east to west. The device that the solar cells 26 may be connected to may include a frame for the solar cells to be mounted to, and that is connected to a motor (not shown). The motor may be in communication, for example, with a controller that controls movement of the frame carrying the solar cells 26. A timer, for example, may be in communication with the controller so that the motor moves the frames and, in turn, tilts the solar cells 26 to track the sun based on the passage of time. The present invention also contemplates the use of a sensor to cause the motor to be operable to tilt the solar cells 26. The solar cells 26 may, for example be tilted to track the sun based on the sensor sensing the position of the sun.

Figure 3:
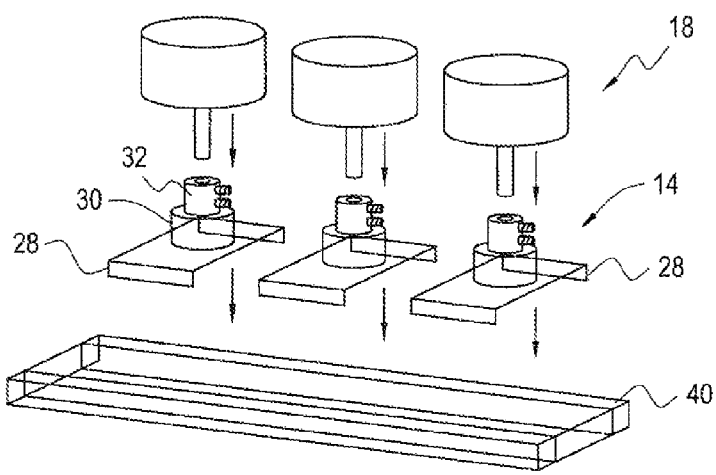
FIG. 3 is an exploded perspective view of an environmental power generation device according to the present invention.

As perhaps best illustrated in FIG. 3, the turbine mounting structure 14 may include a base 28, a lower mounting sleeve 30 connected to the base and an upper mounting sleeve 32 connected to the lower mounting sleeve. The environmental power generation device 10 according to an embodiment of the present invention may further comprise a rotational shaft 34 extending between the wind turbine 16 and the rotor 20. In the embodiment of the environmental power generation device 10 illustrated in FIG. 4, a base portion of the wind turbine 16, for example, may be fixedly connected to the rotational shaft 34. Similarly, the rotor 20 may also be fixedly connected to the rotational shaft 34. Accordingly, rotation of the wind turbine 16 may cause rotation of the rotational shaft 34 which may, in turn, cause rotation of the rotor 20 with respect to the stator 22.

In the embodiment of the environmental power generation device 10' illustrated in FIG. 5 according to the present invention, a base portion of the wind turbine 16' may also be fixedly connected to the rotational shaft 34'. In this embodiment of the environmental power generation device 10', the rotor 20' and the stator 22' of the power generator 18' may be carried adjacent the base 12', spaced apart from the wind turbine 16'. Accordingly, the rotational shaft 34' may be adapted to extend through the lower mounting sleeve of the turbine mounting structure and the upper mounting sleeve of the turbine mounting structure (shown in FIG. 3). As discussed above, rotation of the wind turbine 16' may cause rotation of the rotational shaft 34' to thereby cause rotation of the rotor 20' with respect to the stator 22'. The other elements of this embodiment of the environmental power generation device 10' are similar to those of the first embodiment of the environmental power generation device 10, are labeled with prime notation and require no further discussions herein.

Figure 1:
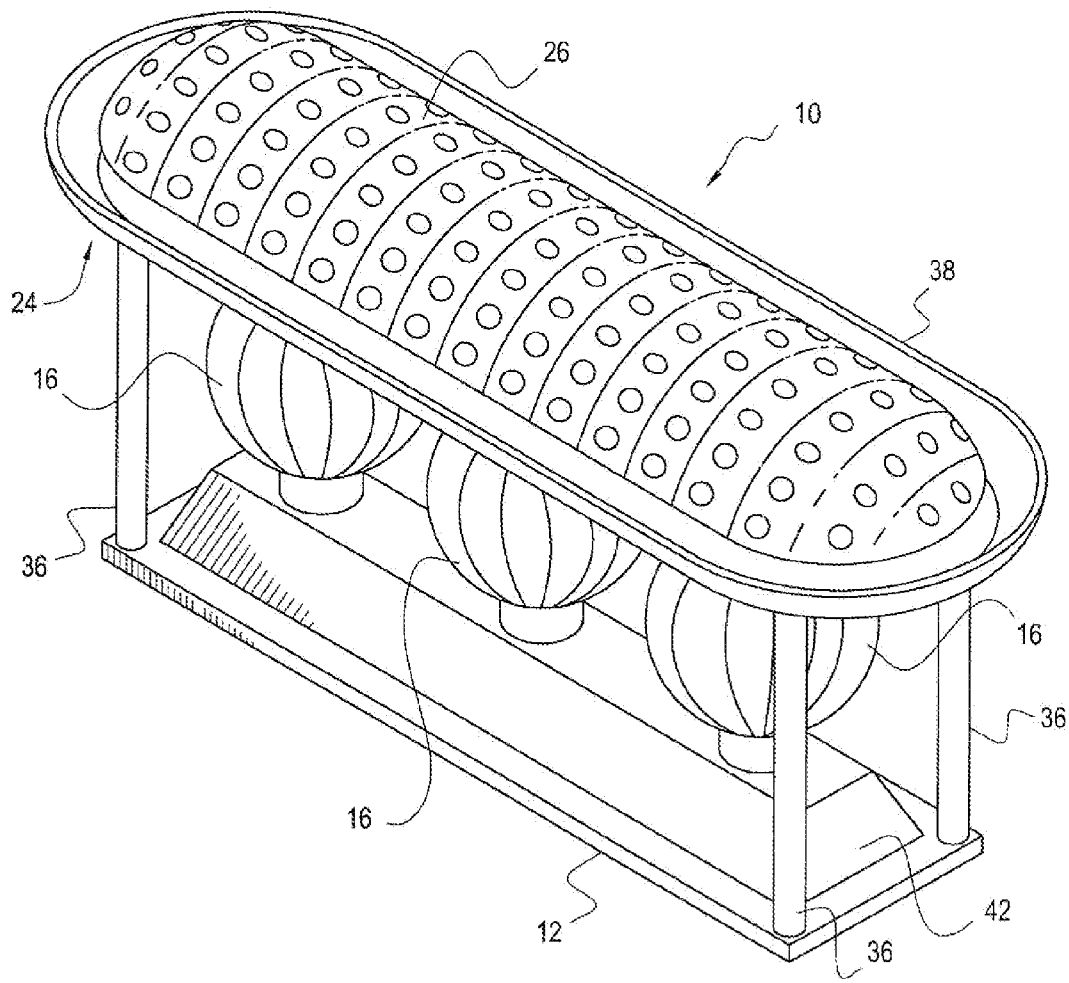
FIG. 1 is a perspective view of an environmental power generation device according to the present invention.

As perhaps best illustrated in FIG. 1, the solar cell mounting structure 24 of the environmental power generation device 10 according to an embodiment of the present invention may include a plurality of support legs 36 connected to and extending upwardly from the base 12. The solar cell mounting structure 24 may also include a solar cell mounting base 38 carried by a top portion of the plurality of support legs 36. The plurality of solar cells 26 may be carried by the solar cell mounting base 38. Further, the solar cell mounting base 38 is preferably mirrored. Those skilled in the art, having had the benefit of this disclosure, will appreciate, however, that a mirrored solar cell mounting base 38 advantageously enhances solar energy collection of the solar cells 26. The solar cell mounting base 38, however, need not be mirrored in order to carry out the objects, features and advantages of the environmental power generation device 10 according to an embodiment of the present invention.

Referring back to FIG. 3, still further features of the environmental power generation device 10 according to an embodiment of the present invention are now described in greater detail. The environmental power generation device 10 may also comprise a mounting track 40 carried by the base 12. Accordingly, the base 28 of the turbine mounting structure 14 may be slidably connected to the mounting track 40. This advantageously allows each of the wind turbines 16 to be slidably moved along the mounting track 40. The slidable adjustment feature provided by the mounting track 40 and turbine mounting structure base 28 advantageously enhance use of the environmental power generation device 10 according to an embodiment of the present invention. More specifically, this configuration allows a user to position the wind turbines 16 as desired based on various factors, such as space restrictions, for example.

As perhaps best illustrated in FIG. 1, the environmental power generation device 10 according to an embodiment of the present invention may also include a cover 42 connected to the base 12 and positioned to overlie the turbine mounting structure 14 and the mounting track 40. This advantageously provides enhanced protection of the turbine mounting structure 14 from, for example, environmental elements. The rotational shaft 34 may, for example, extend through the cover to the power generator 18 as necessary. The cover 42 may be adapted to overlie both the lower mounting sleeve 30 of the turbine mounting structure 14 and the upper mounting sleeve 32 of the turbine mounting structure. Accordingly, the rotational shaft 34 may extend upwardly through the cover, but those skilled in the art will appreciate that the rotational shaft may be completely contained within the cover 42 while still accomplishing the advantages, features and goals according to the present invention.

Figure 2:
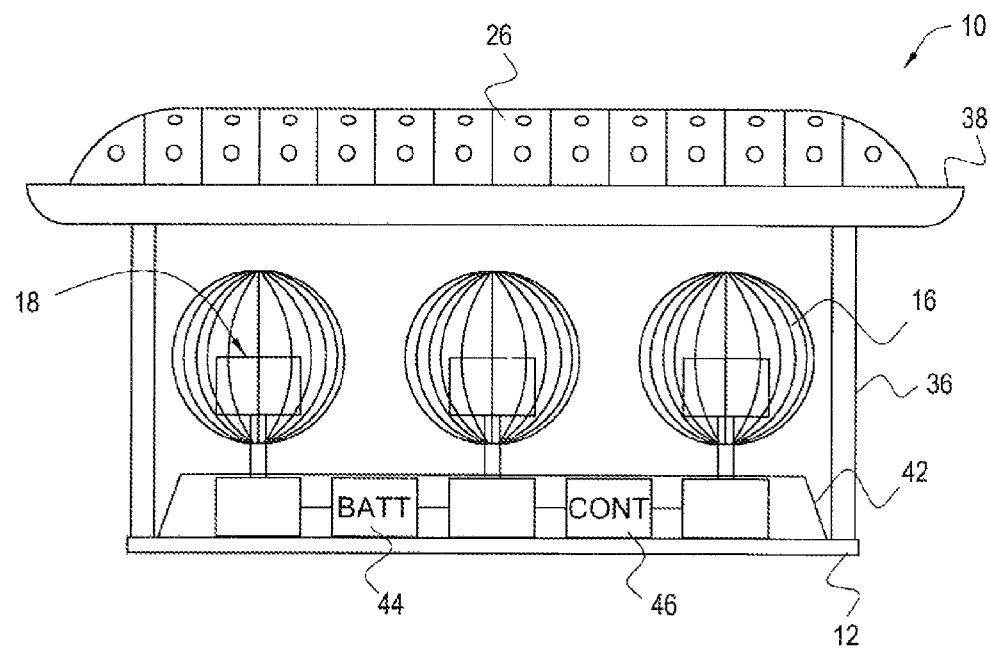
FIG. 2 is a side perspective view of an environmental power generation device according to the present invention.

As illustrated in FIGS. 2, 4 and 5, the environmental power generation device 10 according to the present invention may also include an energy storage device 44 in communication with both the power generator 18 and the solar cells 26. The energy storage device 44 is adapted to store energy generated by the power generator 18 or collected from the solar cells 26. The energy storage device 44 may, for example, be provided by a battery. Although the energy storage device 44 is illustrated as being positioned between a lower portion of the wind turbine 16, those skilled in the art will appreciate that this is merely a design choice and the energy storage device may be positioned anywhere in communication with both the power generator 18 and the solar cells 26. Further, the illustrated embodiments of the power generation device 10, 10' show a single energy storage device 44. After having had the benefit of this disclosure, those skilled in the art will appreciate that any number of energy storage devices 44 may be provided.

The environmental power generation device 10 according to an embodiment of the present invention may further include a controller 46 in communication with the power generator 18, the solar cells 26 and the energy storage device 14. The controller 44 may be used to selectively operate the power generator 13 and the solar cells 26. Accordingly, the controller 46 advantageously allows a user to selectively switch between using the power generator 18 to generate power using the wind turbines 16 or to store energy using the solar cells 26. After having had the benefit of this disclosure, those skilled in the art will appreciate that the controller 46 may also operate to allow both the power generator 18 and solar cells 26 to be used in unison with one another. Those skilled in the art will still further appreciate, after having had the benefit of this disclosure that the controller 46 may be adapted to automatically switch between using the power generator 18 and the solar cells 26. This may be advantageous on cloudy days when, for example, energy production from the solar cells 26 may not be optimal.

Figure 6:
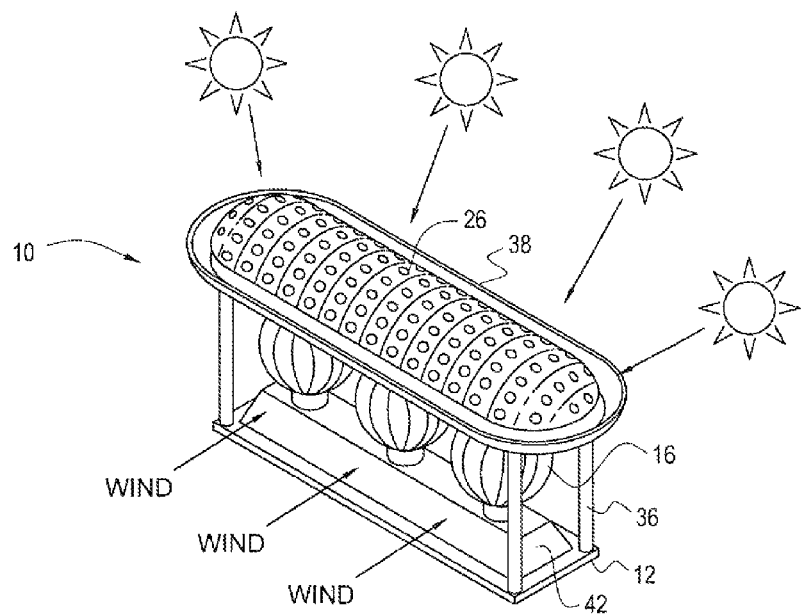
FIG. 6 is an environmental view of an environmental power generation device according to the present invention.
Figure 7:
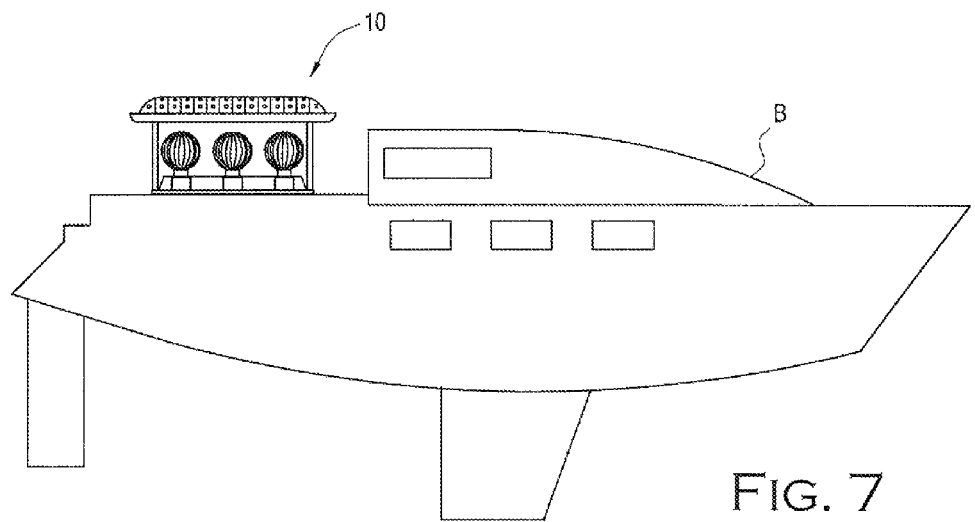
FIG. 7 is an environmental view of an environmental power generation device according to the present invention installed on a boat.

As illustrated in FIG. 6, the environmental power generation device 10 according to an embodiment of the invention may be used to harness energy from natural resources. More specifically, the environmental power generation device 10 may be used to harness power from the wind via the wind turbine 16 as well as the energy from the sun via the solar cells 26. As illustrated in FIG. 7, an embodiment of the environmental power generation device 10 may be used aboard a vessel, such as, for example, a boat B. This advantageously enhances use and flexibility of the environmental power generation device 10. For example, on a vessel B, such as that illustrated in FIG. 7, the environmental power generation device can be used to provide backup power to the general electrical system of the vessel, or may be used to provide power to various electrical systems on board the vessel such as, for example, HVAC, refrigeration, bilge pumps, or any other electrical system that may be used aboard a vessel.

Figure 8:
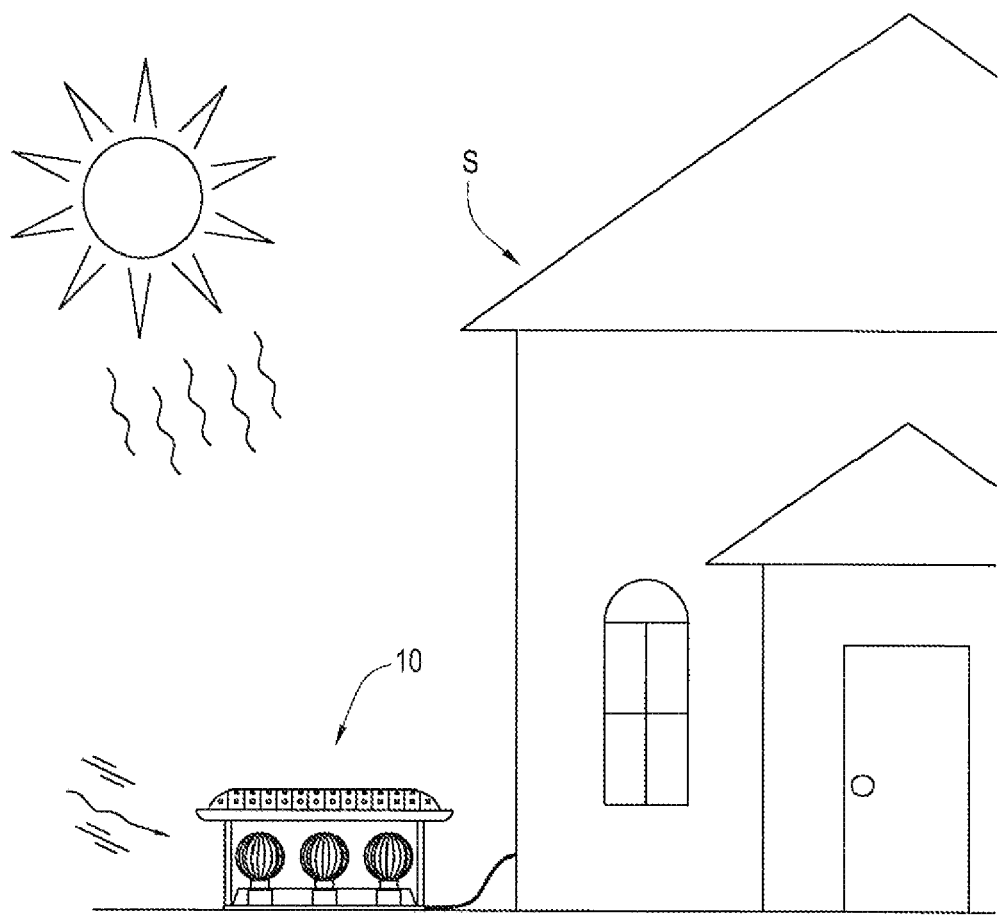
FIG. 8 is an environmental view of an environmental power generation device according to the present invention installed adjacent a residential structure.

As perhaps best illustrated in FIG. 8, an embodiment of the environmental power generation device 10 may also be used to provide power to a structure S. After having had the benefit of this disclosure, those skilled in the art will appreciate that an environmental power generation device 10 according to an embodiment of the present invention may be used in connection with commercial structures as well as residential structures. More specifically, the environmental power generation device 10 may be connected to the electrical system of a structure S, such as that illustrated in FIG. 8. The environmental power generation device 10 may be used to provide backup power to the structure S, or may also be used to supplement the energy consumption of the structure. After having had the benefit of this disclosure, those skilled in the art will also appreciate that the environmental power generation device 10 illustrated in FIG. 8 may also be dedicated to certain electrical systems within the structure S. For example, the environmental power generation device 10 may be dedicated to running a pool pump, for example, or the HVAC system of a structure. The environmental power generation device 10 according to an embodiment of the present invention may be used in connection with any electrical system within any structure S.

Although the environmental power generation device 10 is illustrated as being positioned adjacent the structure S, those skilled in the art will appreciate that the environmental power generation device may, for example, be mounted to the structure. It may be advantageous to mount the environmental power generation device 10 to the structure so as to enhance exposure to the sun and to the wind.

The present invention contemplates that the environmental power generation device 10 may be positioned in communication with an electrical grid of a municipal infrastructure so that excess power generated by the environmental power generation device may be transmitted back to the infrastructure grid for distribution elsewhere. This advantageously decreases energy production requirements by the municipality, while simultaneously resulting in income for the user of the environmental power generation device. Accordingly, the environmental power generation device 10 advantageously provides a user with much flexibility along with reducing consumption of electricity that is generated using non-renewable resources such as, for example, fossil fuels.

Any materials may be used to construct the environmental power generation device 10. It is contemplated that the environmental power generation device 10 will be used and positioned in an exterior location exposed to environmental elements. As such, it is preferably that the materials used to construct the environmental power generation device 10 have high strength properties, as well as high resistance to damage that may be caused by environmental effects. Aluminum may, for example, be used to construct portions of the environmental power generation device 10, but those skilled in the art will appreciate that any other type of similar material having similar properties are also contemplated by the present invention.

A method aspect of the present invention is for harnessing wind energy and solar energy to generate power using the environmental power generation device 10 according to an embodiment of the present invention. The method may include positioning a power generator 18 in communication with a wind turbine 16. The method may also include using the controller 46 to selectively operate at least one of the power generator and the solar cell.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An environmental power generation device comprising:
a base;
a turbine mounting structure carried by the base;
at least one wind turbine carried by the turbine mounting structure;
a respective at least one power generator in communication with the at least one wind turbine and comprising:
a respective at least one rotor in communication with the at least one wind turbine, and
a respective at least one stator in rotational communication with the respective at least one rotor;
a solar cell mounting structure connected to the base;
at least one solar cell connected to the solar cell mounting structure and positioned to overlie the at least one wind turbine; and
a mounting track carried by the base;
wherein the turbine mounting structure includes a base, a lower mounting sleeve connected to the base, and an upper mounting sleeve connected to the lower mounting sleeve;
wherein the base of the turbine mounting structure is slidably connected to the mounting track.

2. An environmental power generation device according to claim 1 wherein the at least one rotor is carried by the at least one wind turbine so that rotation of the at least one wind turbine causes rotation of the at least one rotor.

3. An environmental power generation device according to claim 1, further comprising at least one rotational shaft extending between the at least one wind turbine and the at least one rotor so that rotation of the at least one wind turbine causes rotation of the at least one rotational shaft and so that rotation of the at least one rotational shaft causes rotation of the at least one rotor.

4. An environmental power generation device according to claim 3 wherein the at least one rotational shaft passes through the upper mounting sleeve and the lower mounting sleeve to be connected to the at least one rotor.

5. An environmental power generation device according to claim 1 wherein the solar cell mounting structure includes a plurality of support legs connected to the turbine mounting structure.

6. An environmental power generation device according to claim 5 wherein the solar cell mounting structure includes a solar cell mounting base carried by a top portion of the plurality of support legs.

7. An environmental power generation device according to claim 6 wherein the solar cell mounting base is mirrored.

8. An environmental power generation device according to claim 1 further comprising a cover to be connected to the base and positioned to overlie the turbine mounting structure and the mounting track.

9. An environmental power generation device according to claim 1 further comprising an energy storage device in communication with the respective at least one power generator and the at least one solar cell for storing energy generated by the power generator or collected from the at least one solar cell.

10. An environmental power generation device according to claim 9 wherein the energy storage device is at least one battery.

11. An environmental power generation device according to claim 1 further comprising a controller to selectively operate at least one of the power generator and the at least one solar cell.

12. An environmental power generation device comprising:
- a base;
- a turbine mounting structure carried by the base;
- at least one wind turbine carried by the turbine mounting structure;
- a respective at least one power generator in communication with the at least one wind turbine and comprising:
  - a respective at least one rotor in communication with the at least one wind turbine, and
  - a respective at least one stator in rotational communication with the respective at least one rotor;
- a solar cell mounting structure connected to the base and including a plurality of support legs connected to the turbine mounting structure and a solar cell mounting base carried by a top portion of the plurality of support legs;
- at least one solar cell connected to the solar cell mounting structure and positioned to overlie the at least one wind turbine;
- an energy storage device in communication with the respective at least one power generator and the at least one solar cell for storing energy generated by the power generator or collected from the at least one solar cell;
- a controller to selectively operate at least one of the power generator and the at least one solar cell; and
- a mounting track carried by the base;
- wherein the turbine mounting structure includes a base, a lower mounting sleeve connected to the base, and an upper mounting sleeve connected to the lower mounting sleeve;
- wherein the base of the turbine mounting structure is slidably connected to the mounting track.

13. An environmental power generation device according to claim 12 wherein the at least one rotor is carried by the at least one wind turbine so that rotation of the at least one wind turbine causes rotation of the at least one rotor.

14. An environmental power generation device according to claim 12 further comprising at least one rotational shaft extending between the at least one wind turbine and the at least one rotor so that rotation of the at least one wind turbine causes rotation of the at least one rotational shaft and so that rotation of the at least one rotational shaft causes rotation of the at least one rotor; and wherein the at least one rotational shaft passes through the upper mounting sleeve and the lower mounting sleeve to be connected to the at least one rotor.

15. An environmental power generation device according to claim 12 wherein the solar cell mounting base is mirrored.

* * * * *